United States Patent
Xu et al.

(10) Patent No.: US 10,384,232 B2
(45) Date of Patent: Aug. 20, 2019

(54) LINEAR VIBRATION MOTOR

(71) Applicants: Hongfu Xu, Shenzhen (CN); Zhilin Chai, Shenzhen (CN); Na Wu, Shenzhen (CN); Fanghua Ling, Shenzhen (CN)

(72) Inventors: Hongfu Xu, Shenzhen (CN); Zhilin Chai, Shenzhen (CN); Na Wu, Shenzhen (CN); Fanghua Ling, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 346 days.

(21) Appl. No.: 15/415,914

(22) Filed: Jan. 26, 2017

(65) Prior Publication Data

US 2018/0111162 A1 Apr. 26, 2018

(30) Foreign Application Priority Data

Oct. 25, 2016 (CN) .................... 2016 2 1162085 U

(51) Int. Cl.
| | | |
|---|---|---|
| *H02K 1/34* | (2006.01) | |
| *B06B 1/04* | (2006.01) | |
| *H02K 33/00* | (2006.01) | |
| *H02K 33/18* | (2006.01) | |

(52) U.S. Cl.
CPC .............. *B06B 1/045* (2013.01); *H02K 1/34* (2013.01); *H02K 33/00* (2013.01); *H02K 33/18* (2013.01)

(58) Field of Classification Search
CPC .......... H02K 1/34; H02K 33/00; H02K 33/18; B06B 1/045
See application file for complete search history.

(56) References Cited

U.S. PATENT DOCUMENTS

| | | | | |
|---|---|---|---|---|
| 4,439,700 A * | 3/1984 | Menzel | ...................... | B41J 2/27 310/13 |
| 5,184,037 A * | 2/1993 | Kobayashi | .............. | H01L 41/12 310/26 |
| 5,739,600 A * | 4/1998 | Kobayashi | ................ | B06B 1/08 310/26 |
| 7,701,100 B2 * | 4/2010 | Morel | .................... | H02K 1/278 310/156.19 |
| 9,755,491 B2 * | 9/2017 | Takahashi | .............. | H02K 33/16 |
| 2003/0173832 A1 * | 9/2003 | Hassan | .................. | B64C 21/02 310/12.01 |

* cited by examiner

*Primary Examiner* — Dang D Le
(74) *Attorney, Agent, or Firm* — Na Xu; IPro, PLLC

(57) ABSTRACT

A linear vibration motor is disclosed. The linear vibration motor, includes a housing provided with an accommodation space; a vibrator accommodated in the accommodation space; and an electromagnet accommodated in the accommodation space. The vibrator includes a weight having a through-hole and a plurality of permanent magnets engaging with an inner wall of the through-hole. The electromagnet is located in the through-hole and separated from the permanent magnets. The electromagnet includes an iron core and a coil around the iron core for producing magnet fields interacting with the permanent magnets further for producing attracting and repelling force to drive the vibrator to vibrate.

8 Claims, 1 Drawing Sheet

LINEAR VIBRATION MOTOR

FIELD OF THE PRESENT DISCLOSURE

The present disclosure relates to the vibration motors, and more in particularly to a linear vibration motor used in portable electronic product.

DESCRIPTION OF RELATED ART

Along with the development of electronic technology, portable consumer electronics are more and more popular among people, such as mobile phone, palmtop video game player, palmtop multimedia entertainment devices and so on. These electronic products generally adopt linear vibration motor for system feedback.

At present, the linear vibration motor creates driving force by magnetic lines produced by the permanent magnet to pass through the electrified coil for driving the linear vibration motor to vibrate. However, the magnetic lines produced by the permanent magnet will be reduced in related vibrators, therefore the driving force is smaller. The vibration performance of the linear vibration motor is not obvious and the product user experience is badly affected.

Thereof, it is necessary to disclose and provide an improved linear vibration motor to overcome the above-mentioned disadvantages.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain this disclosure, not intended to limit this disclosure.

Figure 1:
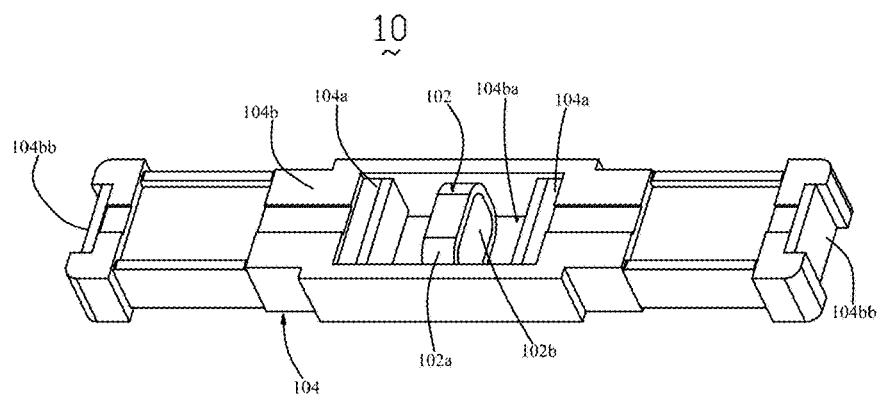
FIG. 1 is an isometric and assembled view of a linear vibration motor in accordance with an exemplary embodiment of the present disclosure, wherein only part of the components of the vibrator is shown.
Figure 2:
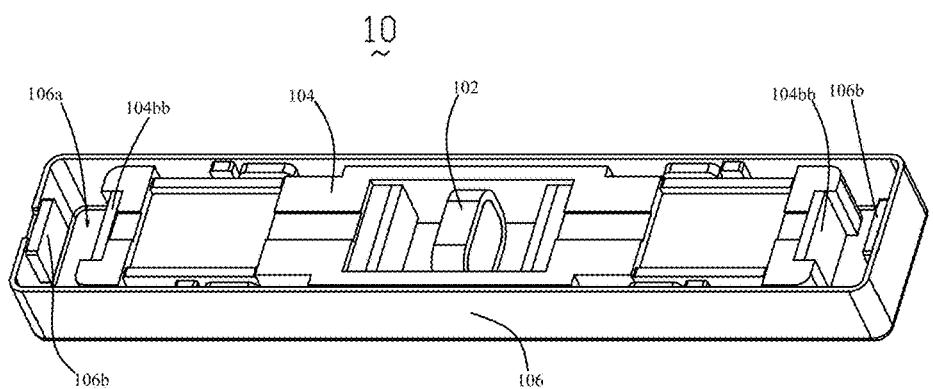
FIG. 2 is similar to FIG. 1, in addition, a housing of the linear vibration motor is assembled.
Figure 3:
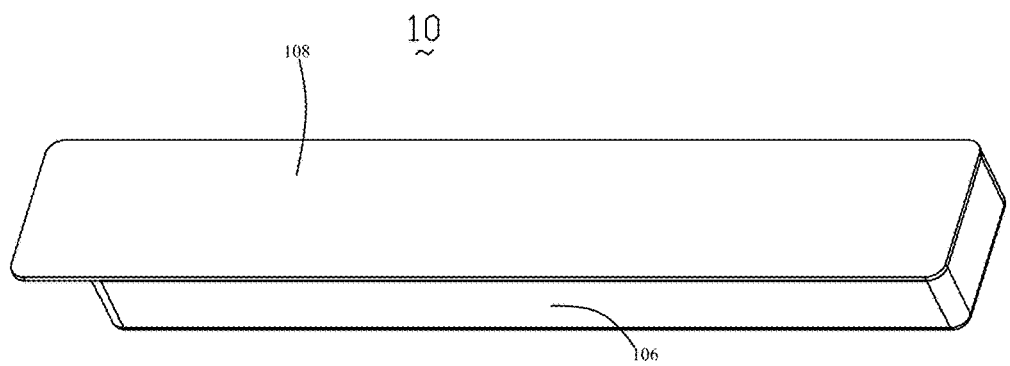
FIG. 3 is an isometric and completely assembled view of the linear vibration motor.

Referring to FIGS. 1-3, a linear vibration motor 10, in accordance with an exemplary embodiment of the present disclosure, includes a housing, an electromagnet 102 and a vibrator 104. The housing includes a housing body 106 comprising a side wall and a bottom wall, and a cover plate 108 engaging with the housing body 106.

The cover plate 108 and the housing body 106 cooperatively form an accommodation space 106a. The electromagnet 102 and the vibrator 104 are received inside the accommodation space 106a. The electromagnet 102 is used for driving the vibrator 104 to vibrate.

The vibrator 104 includes a weight 104b provided with a through-hole 104ba and a permanent magnet 104a installed on the inner wall of the through-hole 104ba. The electromagnet 102 is fixed on the housing and located in the through-hole 104ba and separated from the permanent magnet 104a. The electromagnet 102 is fixed in the through-hole 104ba of the weight 104b, which not only can reduce the length of the linear vibration motor 10 in vibration direction, but also can avoid the local offset of the vibrator 104 due to uneven force produced during vibration, then the vibration stability of the linear vibration motor 10 is improved.

The internal surface of the housing wall is provided with a first magnet 106b. The weight is provided with a second magnet 104bb opposite to the first magnet 106b. The second magnet 104bb and the first magnet 106b are separated from each other. The first magnet 106b and the second magnet 104bb are such arranged that the same magnetic poles of the first and second magnets are faced to each other (N pole of the first magnet faces N pole of the second magnet, or S pole of the first magnet faces S pole of the second magnet). As a result, a repulsive force between the first magnet 106b and the second magnet 104bb is created. Accordingly, the weight is suspended by the repulsive force in the accommodation space.

The electromagnet 102 includes an iron core 102b and a coil 102a wound around the iron core 102b. Optionally, ends of the coil 102a along an axis thereof are aligned with corresponding ends of the iron core 102b for increasing the magnetic force produced by the electromagnet 102. The coil 102a can be wound directly outside the iron core 102b, or the coil 102a is wound outside a cylindrical element firstly and installed outside the iron core 102b then.

The magnetic pole of the permanent magnet 104a on the inner wall of the through-hole 104ba is set opposite to the end of the iron core 102b of the electromagnet 102, and the permanent magnet 104a is located within the range of the magnetic field generated by the electromagnet 102. After the coil 102a is applied with electric power, the permanent magnet 104a is attracted and repelled by the electromagnet 102, and moves back and forth, thereby the vibrator 104 vibrates. The vibration effect of the vibrator 104 is improved and the user experience of the product is increased.

It is important to be noted that the power applied to the coil 102a is AC power, so as to make the polarity on both ends of the iron core 102b of the electric magnet 102 change constantly, to attract and repel the vibrator 104. The entire vibration module 10 can vibrate linearly thereby.

Further, the permanent magnet 104a can be fixed on the inner wall of the thorough hole 104a of the weight 104b by soldering or adhesive bonding, to improve the connection strength between the permanent magnet 104a and the weight 104b, and improve the application stability of is the vibrator 104.

In this embodiment, there are two permanent magnets 104a at least, a first permanent magnet and a second permanent magnet. The first permanent magnet and the second permanent magnet are fixed respectively on the first inner wall and the second inner wall of the through-hole 104ba. The iron core 102b is provided with a first end and a second end which are opposite to each other.

The magnetic pole of the permanent magnet is set opposite to the first end of the iron core 102b and the magnetic pole of the second permanent magnet is set opposite to the second end of the iron core 102b. The polarity of the magnetic pole facing the first end of the first permanent magnet is the same as the polarity of the magnetic pole facing the second end of the second permanent magnet. When the electromagnet 102 is applied with electric power, the first end and the second end of the iron core 102b have different polarity.

When the first end of the iron core 102b and the first permanent magnet repel each other, the second end of the iron core 102b and the second permanent magnet attract each other. When the first end of the iron core 102b and the first permanent magnet attract each other, the second end of the iron core 102b and the second permanent magnet repel each other. This design not only can improve the driving force of the electromagnet 102 to drive the vibrator 104 to vibrate, improve greatly the vibration effect of the vibration module 10. Moreover, as the first permanent magnet and the second permanent magnet are installed symmetrically on both ends of the iron core 102b, an enough driving force is created on both sides of the electromagnet 102 and the vibrator 104 becomes more stable in the process of vibration.

Optionally, the first inner wall of the through-hole 104ba can be equipped with a first mounting groove to install the first permanent magnet and the second inner wall of the through-hole 104ba can be equipped with a second mounting groove to install the second permanent magnet. The first permanent magnet and the second permanent magnet not only can be installed quickly in this way, the connection strength between the permanent magnet and the second permanent magnet with the weight 104b can be increased also.

After the first permanent magnet and the second permanent magnet are respectively installed in the first mounting groove and the second mounting groove, the first permanent magnet and the second permanent magnet can be fixed on the weight 104b by soldering or adhesive bonding. The application stability of the vibrator 104 can be improved thereby.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor, comprising:
a housing provided with an accommodation space;
a vibrator accommodated in the accommodation space, the vibrator including a weight having a through-hole and a plurality of permanent magnets engaging with an inner wall of the through-hole;
an electromagnet accommodated in the accommodation space, the electromagnet being located in the through-hole and separated from the permanent magnets; wherein
the electromagnet includes an iron core and a coil around the iron core for producing magnet fields interacting with the permanent magnets further for producing attracting and repelling force to drive the vibrator to vibrate; and
the linear vibration motor further comprises a first magnet fixed on an internal surface of the housing and provided on two opposite sides of the housing, and a second magnet fixed on two opposite sides of the weight the first magnet and the second magnet, on a same side of the weight, are mutually opposite with each other; a magnetic pole of the first magnet is same to a magnetic pole of the second magnet facing the first magnet for generating a repulsive force between the weight and the housing; the weight is suspended and supported only through the repulsing force generated on two opposite sides of the weight.

2. The linear vibration motor as described in claim 1, wherein the permanent magnet includes a first permanent magnet and a second permanent magnet, and the through-hole has a first inner wall for positioning the first permanent magnet and a second inner wall for engaging with the second permanent magnet.

3. The linear vibration motor as described in claim 2, wherein the iron core has a first end opposite to a magnetic pole of the first permanent magnet and a second end opposite to a magnetic pole of the second permanent magnet, the polarity of the magnetic pole of the first permanent magnet facing the first end is the same as the polarity of the magnetic pole of the second permanent magnet facing the second end.

4. The linear vibration motor as described in claim 2, wherein the first inner wall is provided with a first mounting groove for positioning the first permanent magnet.

5. The linear vibration motor as described in claim 4, wherein the second inner wall is provided with a second mounting groove for positioning the second permanent magnet.

6. The linear vibration motor as described in claim 1, wherein the permanent magnet is fixed on the inner wall of the thorough hole by soldering or adhesive bonding.

7. The linear vibration motor as described in claim 1, wherein two ends of the coil along an axis thereof are aligned with two ends of the iron core.

8. The linear vibration motor as described in claim 1, wherein the housing includes a housing body having a side wall and a bottom wall, and a cover plate engaging with the housing body for forming the accommodation space.

* * * * *